United States Patent Office 3,271,319

Patented Sept. 6, 1966

3,271,319

WATER STAIN REMOVER

Carl H. B. Morrison, 4045 S. Cherry Ave., Fresno 6, Calif.

No Drawing. Filed Jan. 9, 1963, Ser. No. 250,233
2 Claims. (Cl. 252—142)

This invention relates to a composition for removing stains from glass surfaces and particularly the stains left by water and water droplets remaining and drying on glass surfaces and surfaces of glazed articles, ceramic ware, porcelain, glass mirrors and the like. The cleaning compositions heretofore employed for this purpose have been only partially successful for removing water stains, principally because they remove only the loosely adherent material on the glass. The purpose of this invention is to provide a cleaner which will remove the tightly adherent deposits of calcium salts, silica and the like which are so firmly bound to the glass that they cannot be removed readily by the use of abrasives. This invention also relates to a cleaning composition which does not employ abrasives but instead employs a chemical action provided by hydrofluoric acid.

I have discovered that hydrofluoric acid will not only remove the stains which are the result of deposits adhering to the surface of the glass but also will remove stains which are etched into the glass by the action of water and water soluble alkalies which are frequently found in ordinary tap water. My improved cleaning composition removes these stains and leaves the glass with a brilliant surface not obtainable by the ordinary abrasive cleaning compositions.

Heretofore hydrofluoric acid has been used for cleaning brickwork, stonework and the like but its use on glass has not been successful because of the danger of etching.

I have now discovered that if the concentration of the acid is carefully controlled within the range of about 5 to 10%, the danger of etching is substantially eliminated. I have also found that by incorporating a thickening agent with the acid, it can be maintained as a liquid film on the surface of the glass during the cleaning operation, thereby avoiding contact of the glass with the acid vapor. I have found that when the glass is exposed to the vapor of the acid, the danger of etching is greatly increased. For this purpose I prefer to use water soluble gums, resins and high molecular weight organic polymers. As examples of such materials I may use the cellulose ethers such as carboxy methyl cellulose, various natural gums such as the alginates and water soluble polymers as exemplified by the polyvinyl alcohols. The amount of thickening agent required is quite small, usually in the range of about 0.1% to 2% depending on the effectiveness. It is desirable to add sufficient thickening agent to increase the viscosity of the acid to about 100 to 1000 seconds Saybolt Universal at 100° F. The resulting product has a slimy character which causes it to spread easily over the surface of the glass and remain as a thin liquid film for a short time until the acid has dissolved the stain from the surface of the glass. This usually requires only about 5 seconds to one minute. The acid is then washed from the glass with copious amounts of water to prevent further chemical action. It is desirable to apply the solution to an area no larger than can be rinsed before the acid film dries.

When my improved cleaner is employed for removing stains from enameled ironware and porcelain such as bathtubs, lavatories, sinks and the like, it is sometimes advisable to employ in the composition, a wetting agent which will speed contact with greasy or oily surfaces. Any of the usual wetting agents can be employed for this purpose such as the alkyl sulphates, the alkyl aryl sulphonates, the esters and ethers of sorbitol and similar polyhydroxy alcohols, and the like. These wetting agents usually have from 8 to about 16 carbon atoms in the molecule and, of course, are highly water soluble. The amount required in my composition is quite small, usually within the range of about .05 to 1%.

My composition may also include a small amount of hydrochloric acid for the purpose of dissolving calcareous deposits. Although such deposits are removed by the hydrofluoric acid, the action can be speeded up by incorporating about 2 to 5% of hydrochloric acid in the composition.

The following are examples of compositions which I may use:

*Example 1*

| | |
|---|---|
| Water | 87 lbs., 3.2 oz. |
| Sodium carboxy methyl cellulose (Hercules 7 HP or Dow Methocel 65 HG 4000 CSP) | 12.8 oz. |
| Sodium 2 ethyl hexyl sulphate (Union Carbide Anionic 8) | 3 oz. |
| Hydrofluoric acid (49%) | 11 lbs., 13 oz. |

In preparing this composition the ingredients may be added in any order desired, but I prefer to add the thickening agent, the carboxy methyl cellulose, to the water then add the wetting agent, the sodium 2 ethyl hexyl sulphate, and finally the hydrofluoric acid.

*Example 2*

| | Percent |
|---|---|
| Hydrofluoric acid | 8 |
| Carboxy methyl cellulose | 0.8 |
| Sodium octyl sulfate | 0.2 |
| Water | 91 |

*Example 3*

| | |
|---|---|
| Hydrofluoric acid | 5 |
| Polyvinyl alcohol | 1 |
| Water | 94 |

*Example 4*

| | |
|---|---|
| Hydrofluoric acid | 7 |
| Water | 93 |

In addition to the ingredients shown in the foregoing formulas, I may add a compatible dye to give the cleaner a characteristic color. Any water soluble, acid resistant dye can be used, such as methyl orange, quinoline yellow, methylene blue or one of the numerous vegetable colors.

In handling and storing hydrofluoric acid it is, of course, necessary to keep it out of prolonged contact with glass and metal. It is very convenient to employ containers made of or lined with organic resins such as polyethylene or propylene. Paraffin wax can also be used to impregnate paper containers, or glass fiber containers can be impregnated with resins, such as the epoxy resins, polystyrene or polyethylene.

In applying my improved glass cleaner, it can be spread on the glass by application with a sponge made of cellulose fiber or a natural sponge can be used. Also a soft cloth can be employed for the purpose. After allowing the composition to remain on the glass for a few seconds to a minute or two it is desirable to wash it off with a sufficient volume of water to stop further action. Rubber gloves should be worn in handling the solution to protect the hands, especially where long time of contact is encountered.

When my improved cleaner is applied to windows, mirrors or the windshields of automobiles for example which have been clouded by weathering and by aging for a period of years, the original brilliance of the glass is restored. The cleaner is especially effective on glass show cases in markets where produce is displayed and the glass is frequently sprayed with water.

In preparing my glass cleaning composition, I can employ any of the usual concentrations of hydrofluoric acid commercially available and adjust the concentration by addition of water. Thus I have employed acid of 70% strength which is available in plastic containers. I can also use anhydrous HF which is available in steel containers. When reference is made herein to the concentration of acid in my composition, concentration of anhydrous HF by weight is meant.

Having thus described my invention what I claim is:

1. A fluid water stain remover having a Saybolt Universal viscosity of about 200 to 1500 seconds at 100° F. suitable for application to glass and glazed surfaces spotted by the action of water droplets, which comprises the following ingredients in solution:

| | Percent |
|---|---|
| Hydrofluoric acid | 8 |
| Carboxy methyl cellulose | 0.8 |
| Sodium octyl sulfate | 0.2 |
| Water | 91 |

2. A fluid water stain remover having a Saybolt Universal viscosity of about 200 to 1500 seconds at 100° F., suitable for application to glass and glazed surfaces spotted by the action of water droplets, which comprises the following ingredients in solution:

| | Percent |
|---|---|
| Hydrofluoric acid | About 5 to 10. |
| Water soluble thickener | About 0.1 to 2. |
| Organic wetting agent | About 0.05 to 1. |

Water to make 100%.

References Cited by the Examiner

FOREIGN PATENTS

| | | |
|---|---|---|
| 15,101 | 1891 | Great Britain. |
| 697,290 | 9/1953 | Great Britain. |

OTHER REFERENCES

Bennett, Chemical Formulary (1943), Chem. Publ. Co., vol. 6, p. 389.

Union Carbide Chem. Co., Tergitol Surfactants (1956), pages 6, 19.

LEON D. ROSDOL, *Primary Examiner.*

JULIUS GREENWALD, *Examiner.*

W. E. SCHULZ, *Assistant Examiner.*